(12) United States Patent  
Reed et al.

(10) Patent No.: US 9,292,427 B2  
(45) Date of Patent: *Mar. 22, 2016

(54) MODIFYING MEMORY SPACE ALLOCATION FOR INACTIVE TASKS

(75) Inventors: David C. Reed, Tucson, AZ (US); Michael R. Scott, Ocean View, HI (US); Max D. Smith, Tucson, AZ (US); Ryan J. Wisniewski, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 263 days.

This patent is subject to a terminal disclaimer.

(21) Appl. No.: 13/614,913

(22) Filed: Sep. 13, 2012

(65) Prior Publication Data

US 2014/0075139 A1    Mar. 13, 2014

(51) Int. Cl.
  *G06F 12/00* (2006.01)
  *G06F 12/02* (2006.01)
  *G06F 9/50* (2006.01)

(52) U.S. Cl.
  CPC .............. *G06F 12/02* (2013.01); *G06F 9/5022* (2013.01)

(58) Field of Classification Search
  CPC .............................. G06F 12/02; G06F 12/0223
  USPC .................................................. 711/170, 173
  See application file for complete search history.

(56) References Cited

U.S. PATENT DOCUMENTS

| | | | |
|---|---|---|---|
| 6,718,450 B2 * | 4/2004 | Hironaka | 711/170 |
| 6,910,210 B1 | 6/2005 | Chew | |
| 7,634,542 B1 | 12/2009 | Krause et al. | |
| 8,615,739 B2 * | 12/2013 | Nir et al. | 717/124 |
| 2002/0147966 A1 | 10/2002 | Frazier | |
| 2004/0194153 A1 * | 9/2004 | Garg et al. | 725/151 |
| 2006/0212869 A1 | 9/2006 | Bril et al. | |
| 2007/0300239 A1 | 12/2007 | Adam et al. | |
| 2008/0016374 A1 * | 1/2008 | Gee et al. | 713/300 |
| 2009/0113444 A1 | 4/2009 | Hackborn et al. | |
| 2009/0144349 A1 * | 6/2009 | Phillips et al. | 707/206 |
| 2013/0047198 A1 * | 2/2013 | Srour et al. | 726/1 |

OTHER PUBLICATIONS

Response dated Feb. 18, 2015, pp. 8, to Final Office Action dated Dec. 15, 2014, pp. 12, for U.S. Appl. No. 14/080,794, filed Nov. 15, 2013.
Office Action dated Jul. 23, 2015, pp. 17, for U.S. Appl. No. 14/080,794, filed Nov. 15, 2013.
Response dated Oct. 23, 2015, pp. 9, to Office Action dated Jul. 23, 2015, pp. 17, for U.S. Appl. No. 14/080,794, filed Nov. 15, 2013.

* cited by examiner

*Primary Examiner* — Gurtej Bansal
(74) *Attorney, Agent, or Firm* — David W. Victor; Konrad Raynes Davda & Victor LLP

(57) ABSTRACT

Provided are a computer program product, system, and method for modifying memory space allocation for inactive tasks. Information is maintained on computational resources consumed by tasks running in the computer system allocated memory space in the memory. The information on the computational resources consumed by the tasks is used to determine inactive tasks of the tasks. The allocation of the memory space allocated to at least one of the determined inactive tasks is modified.

20 Claims, 7 Drawing Sheets

System Task Table Entry

Task Resource Consumption

Resource Thresholds

MODIFYING MEMORY SPACE ALLOCATION FOR INACTIVE TASKS

BACKGROUND OF THE INVENTION

1. Field of the Invention

The present invention relates to a computer program product, system, and method for modifying memory space allocation for inactive tasks.

2. Description of the Related Art

An operating system instantiates tasks to perform application and operating system operations. Each task is allocated an amount of system memory, which remains allocated to the task even when the task is not running, such as not executing instructions. The memory allocated to the task may store executable code for the task and working memory. Many tasks may be called very infrequently or may not run at all. These infrequently executed tasks may retain their allocated memory space. Because available memory is a limited computing resource, infrequently used tasks that maintain memory space allocations may slow down or limit the operability of applications that the user wants to frequently run.

There is a need in the art for improving the management of allocating memory space to tasks running in a computer system.

SUMMARY

Provided are a computer program product, system, and method for modifying memory space allocation for inactive tasks. Information is maintained on computational resources consumed by tasks running in the computer system allocated memory space in the memory. The information on the computational resources consumed by the tasks is used to determine inactive tasks of the tasks. The allocation of the memory space allocated to at least one of the determined inactive tasks is modified.

DETAILED DESCRIPTION

Described embodiments provide techniques for determining inactive tasks that are allocated memory space and then modifying the memory space allocation for one or more inactive tasks to free memory space to make available for other more frequently used and important tasks. Inactive tasks that consume memory space not only negatively affect the performance of more important tasks but also require increased power consumption to process the inactive task to maintain the memory space allocation for the inactive task. Power consumption is especially important for mobile devices because inactive tasks can be a drain on the battery life of a mobile computational device, such as a laptop, tablet or smart phone.

Figure 1:
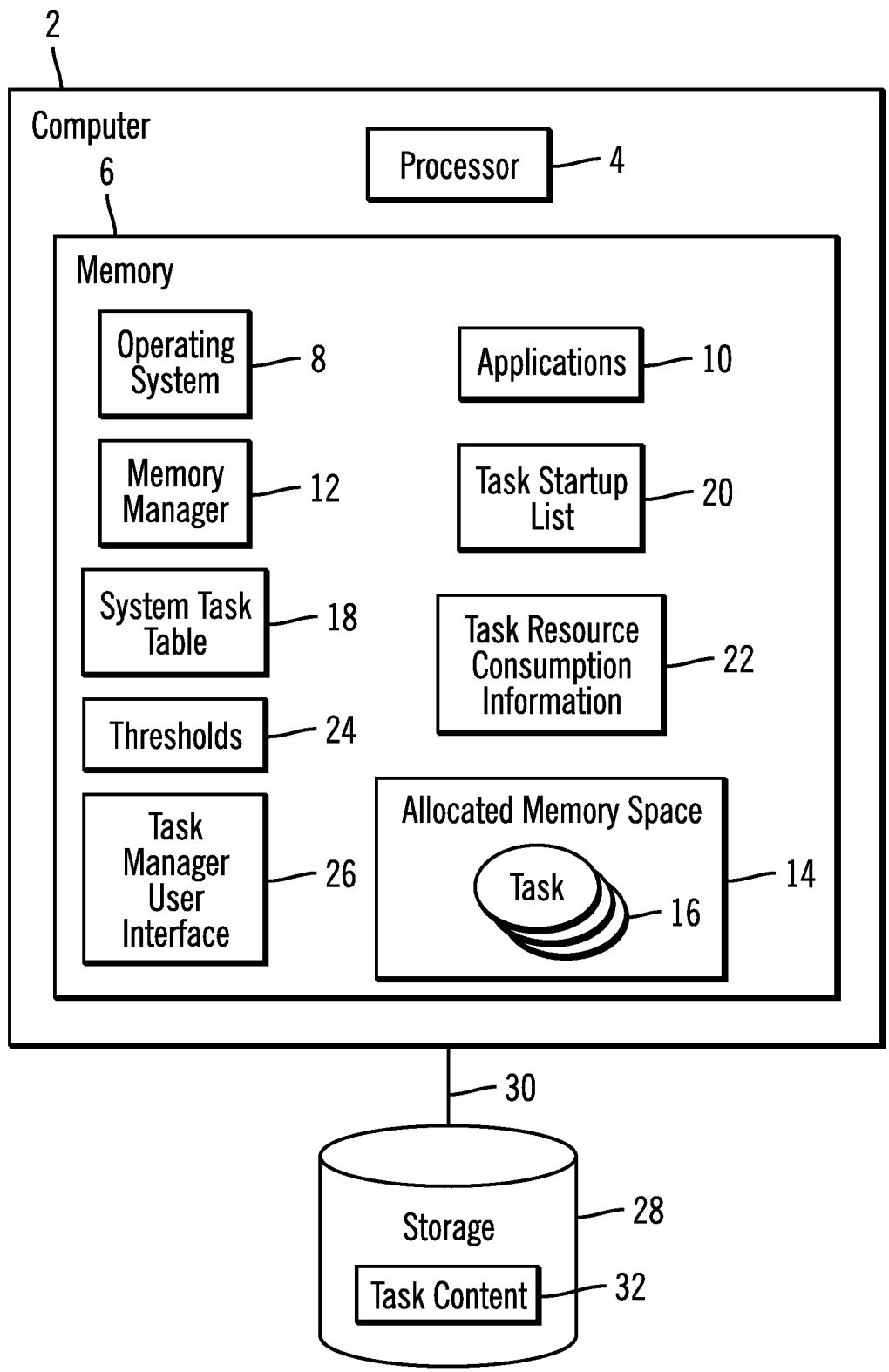
FIG. 1 illustrates an embodiment a computing environment.

FIG. 1 illustrates an embodiment of a computing environment. A computer 2 includes a processor 4, which may comprise one or more processors and/or cores, and a memory 6 including programs executed by the processor 4, such as an operating system 8, one or more applications 10, and a memory manager 12. The memory manager 12 may manage the allocation of memory space, e.g., memory addresses, in allocated memory space 14 in the memory 6 to tasks 16 initiated by the applications 10. A task 16 may comprise a process or thread initiated to perform application 10 operations. The memory manager 12 maintains a system task table 16 having information on tasks 16 allocated memory space 14 and a task startup list 20 indicating tasks 16 that are allocated memory space 14 at the beginning of a session or at system initialization, i.e., tasks 16 automatically loaded into the memory 6 at startup. The memory manager 12 further gathers task resource consumption information 22, which comprises a measurement of computational resources the tasks 16 allocated memory space 14 have consumed.

The allocated memory space 14 stores data used by tasks initiated by the applications 10 in the computer 2 and by applications remote with respect to the computer 2, such as in different client or server systems that communicate with the computer 2 over a network (not shown). The memory space 14 may further store data used by tasks 16 initiated by the host operating system 8, such as system state information. The memory manager 12 considers resource thresholds 24 to determine when the resource consumption of tasks 16 and available memory space 6 has reached a level requiring the modification of memory space 14 allocations to tasks 16.

The memory manager 12 may generate a task manager user interface 26, such as a graphical user interface (GUI) or command line interface, to interact with a user of the computer 2 to enable the user to select inactive tasks 16 to have their memory space 14 allocation modified, i.e., reduced or eliminated.

The computer 2 may comprise a computational device known in the art, such as a personal computer, laptop, notebook, tablet, smart phone, server, storage controller, telephony device, mainframe, etc.

In one embodiment, the memory 6 may comprise one or more volatile or non-volatile storage devices, such as a Dynamic Random Access Memory (DRAM), Random Access Memory (RAM) or a non-volatile memory, e.g., battery backed-up Random Access Memory (RAM), static RAM (SRAM), solid state storage devices (SSDs), etc.

The computer 2 may communicate Input/Output (I/O) requests to a storage 28 used by the computer 2. The storage 28 may comprise one or more storage devices known in the art, such as interconnected storage devices (e.g., configured as a DASD, RAID, JBOD, virtualized devices, etc.), as a solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The computer 2 communicates with the storage 28 via a connection 30. The connection 30 may comprise a network such as a Local Area Network (LAN), Storage Area Network (SAN), Wide Area Network (WAN), peer-to-peer network, wireless network, etc. Alternatively, the connection 30 may comprise a bus interface, such as a Peripheral Component Interconnect (PCI) bus or serial interface. The operating system 8 may comprise suitable operating systems known in the art, such as the International Business Machines ("IBM®") Z/OS® operating system, WINDOWS®, iOS®, OS X®, and ANDROID™. (IBM and Z/OS are trademarks of IBM in the United States and foreign countries, WINDOWS is a registered trademark of Microsoft Corporation in the U.S. and foreign countries, OS X is registered trademark of Apple Inc., iOS is a registered trademark of Cisco Systems Inc. and is used or licensed by Apple Inc., and ANDROID is a trademark of Google, Inc.).

Programs and data loaded into the memory 6 for execution by the processor 4 may be stored in the storage 28 and loaded from the storage 28 into the memory 6 as needed. The storage 28 may also store task content 32 for one or more tasks, where the task content 34 for one task 16 comprises data generated and used by the task 16 in the allocated memory space 14.

The memory manager 12 may be implemented, in whole or in part, in software and/or with hardware logic, such as an Application Specific Integrated Circuit (ASIC), Field Programmable Gate Array (FPGA), etc. or firmware.

Figure 2:
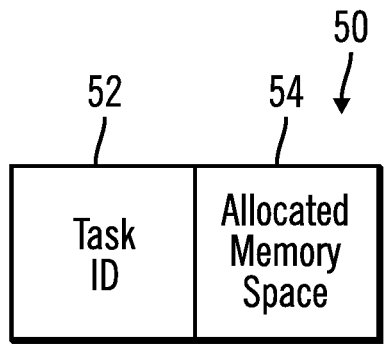
FIG. 2 illustrates an embodiment of a system task table entry.

FIG. 2 illustrates an embodiment of a system task table entry 50 comprising an instance of information maintained for a task 16 in the system task table 18, including a task identifier (ID) 52 and the allocated memory space 54, e.g., memory addresses, allocated to the task 52. The entry 50 may include additional information for the task 16. The allocated memory space 54 may comprise an initial allocation and any supplemental allocations.

Figure 3:
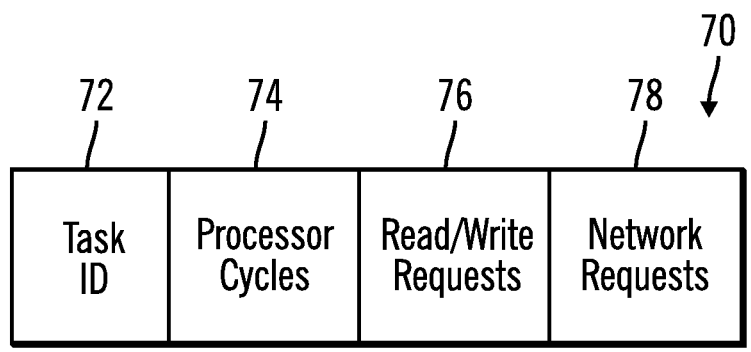
FIG. 3 illustrates an embodiment of a task resource consumption.

FIG. 3 illustrates an embodiment of task resource consumption information 70 gathered for one task 16 and maintained in the task resource consumption information 22, including a task ID 72 identifying the task; a number of processor cycles 74 consumed by the task 72 to perform operations; read and write requests initiated by the task 72; and network requests, e.g., TCP/IP requests, initiated by the task 72. The task resource consumption information may maintain other information on operations performed. Further, the resource consumption information may not include all the information shown in FIG. 3. For instance, the task resource consumption 70 may only include the processor cycles 74 as an indication of how active the task 16 has been. The task resource consumption information 22 may be gathered across one or multiple sessions or system initializations, or maintained for a limited number of sessions or system initializations.

Figure 4:
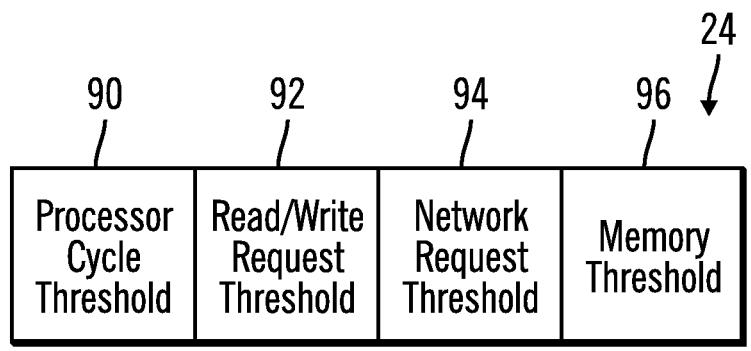
FIG. 4 illustrates an embodiment of resource thresholds.

FIG. 4 illustrates an embodiment of resource thresholds 24 used by the memory manager 12 to determine when a task is sufficiently inactive to be eligible to have the allocated memory space 54 modified. The resource thresholds 24 include a processor cycle threshold 90 for comparison with the measured number of processor cycles 74; a read/write request threshold 92 for comparison with the measured number of read/write requests 76; and a network requests threshold 94 for comparison with a number of network requests 78. There may be additional resource thresholds for other types of measured resource consumption types. In one embodiment, the memory space allocation may only be modified, such as reduced, if all the measured resource consumptions 74, 76, and 78 fall below their corresponding resource thresholds 90, 92, and 94. In an alternative embodiment, any number of the measured resource consumptions 74, 76, and 78 falling below their respective resource thresholds 90, 92, and 94 may result in a modification of the memory resource allocation 54 for the task 16. A memory threshold 96 is used to compare with available memory 6 resources such that the memory manager 12 may initiate operations to modify the memory space allocation to tasks 16 to free memory space when available memory 6 space falls below the memory threshold 96.

Further embodiments of the system task table entry 50 (FIG. 2), task resource consumption 70 (FIG. 3), and thresholds 24 (FIG. 4) may include additional and different information than shown in FIGS. 2, 3, and 4, and may not include certain of the information shown in FIGS. 2, 3, and 4.

Figure 5:
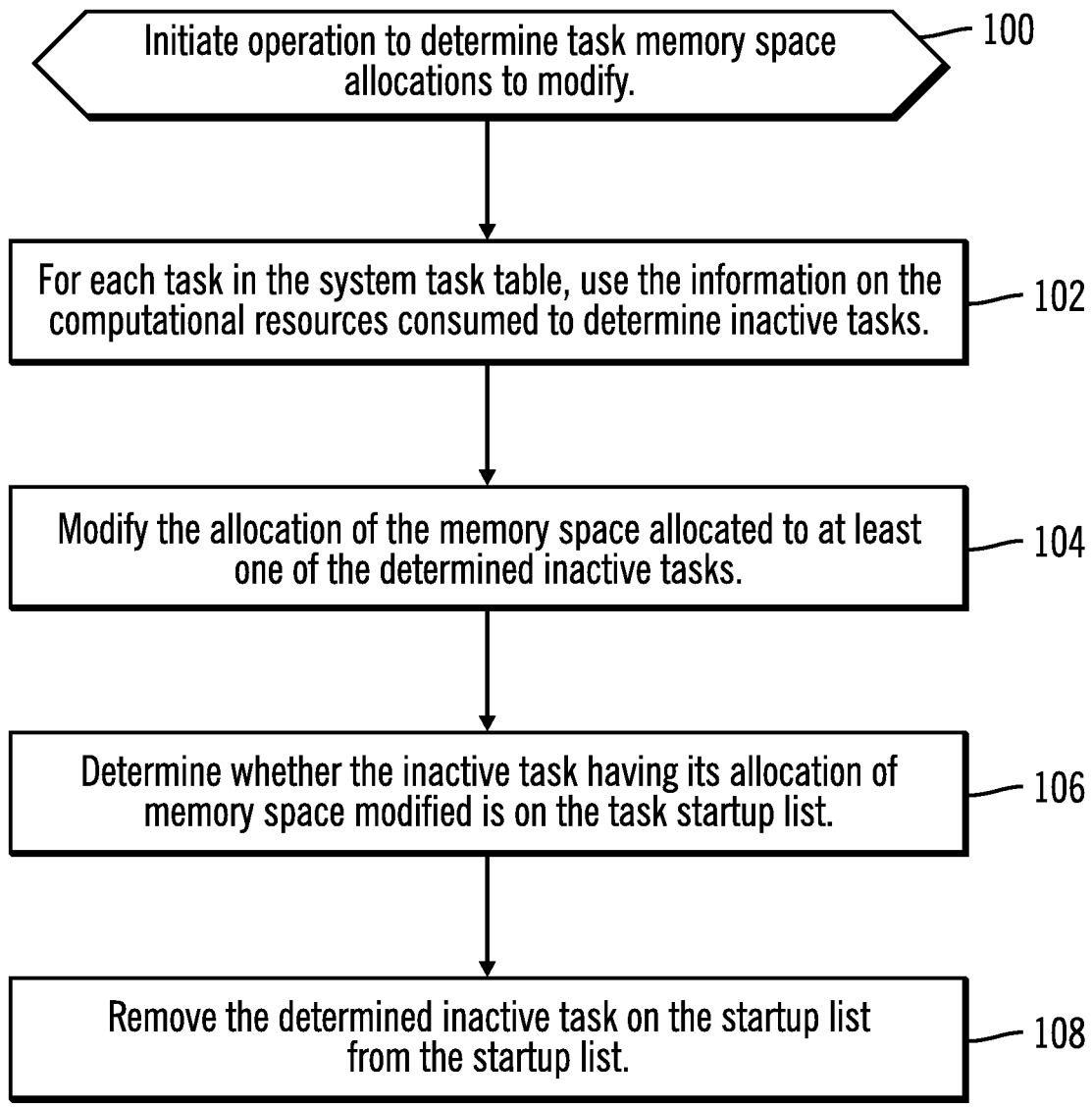
FIG. 5 illustrates an embodiment of operations to determine task memory space allocations for inactive tasks to modify.

FIG. 5 illustrates an embodiment of operations performed by the memory manager 12 to determine memory space allocations to tasks 16 to modify. The operations of FIG. 5 may be initiated upon determining that the available memory 6 to allocate to tasks has fallen below the memory threshold 96. Alternatively, the operations of FIG. 5 may be performed periodically to reduce the memory space allocations to tasks 16 deemed inactive. Upon initiating the operation (at block 100), for each task 50 in the system task table 50, the memory manager 20 uses (at block 102) task resource consumption information 70 for the tasks to determine inactive tasks. A task may be deemed inactive if one or more different types of measured resource consumptions 74, 76, 78 for the task 16 has fallen below the corresponding resource threshold 90, 92, 94. In one embodiment, a task 16 is deemed inactive only if all the measured resource consumptions 74, 76, and 78 are below the corresponding resource thresholds 90, 92, and 94, respectively. In an alternative embodiment, a task may be deemed inactive if only one or less than all the measured resource consumptions 74, 76, and 78 are below the corresponding resource thresholds 90, 92, and 94, respectively. In a further embodiment, only one measured resource consumption may be used to determine inactivity, such as the processor cycles 74, which are consumed whenever a task 16 does any operation.

The memory manager 12 modifies (at block 104) the allocation of the memory space allocated to at least one of the determined inactive tasks. To modify the allocation, the memory manager 12 may deallocate all or a portion of the memory space allocated to the inactive task 16 to reduce the allocated memory space 54. If (at block 106) the inactive task 16 having its allocation of memory space modified is on the task startup list 20, then the determined inactive task may be removed (at block 108) from the task startup list 20, so that the inactive task is not allocated memory space 14 during the next system or session initialization, e.g., system startup.

Figure 6:
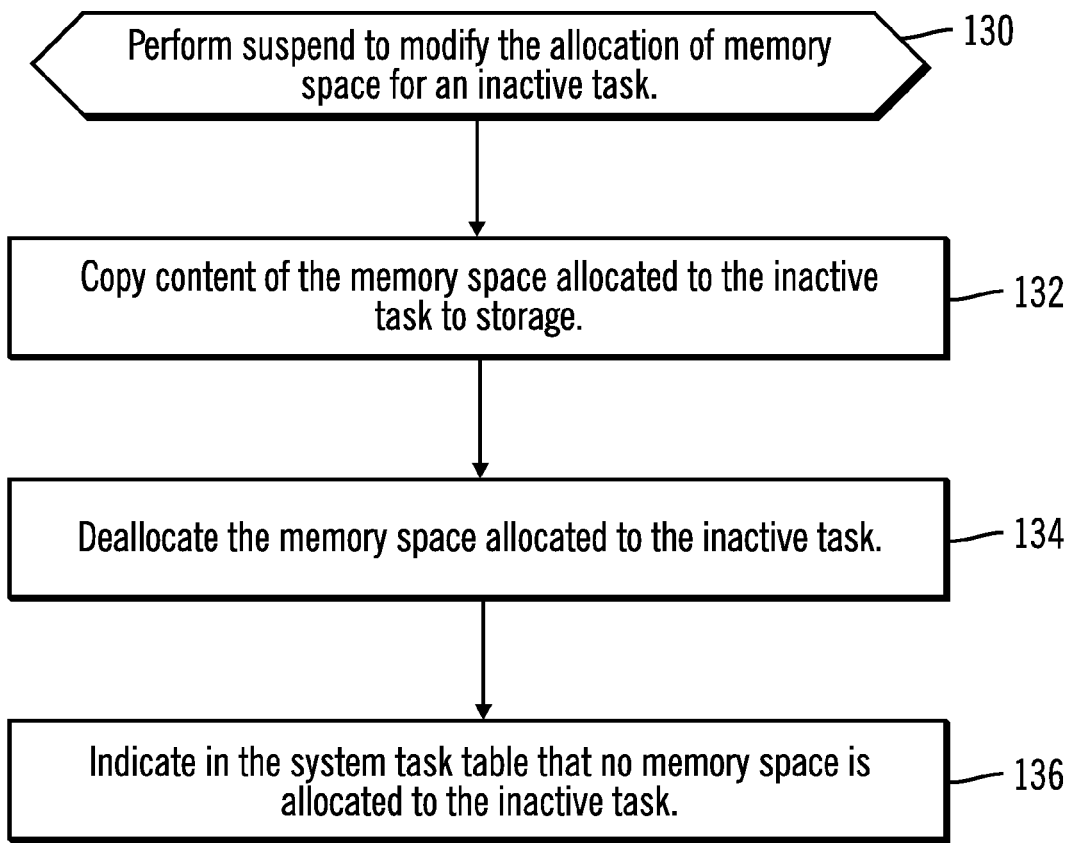
FIG. 6 illustrates an embodiment of operations to suspend an inactive task.

FIG. 6 illustrates an embodiment of operations performed by the memory manager 12 to modify the allocation of memory space by suspending the inactive task 16. Upon initiating the operation to suspend an inactive task (at block 130), the memory manager 12 copies (at block 132) the content of the memory space allocated to the inactive task 16 to task content 32 for the inactive task in the storage 28 and deallocates (at block 134) some or all of the memory space for the inactive task 16. The memory manager 12 updates (at block 136) the allocated memory space 54 field in the system task table 18 to indicate that no memory space is allocated to the inactive task. If only a portion of the inactive task memory space is deallocated, then the remaining memory space would be indicated in the system task table 18.

Figure 7:
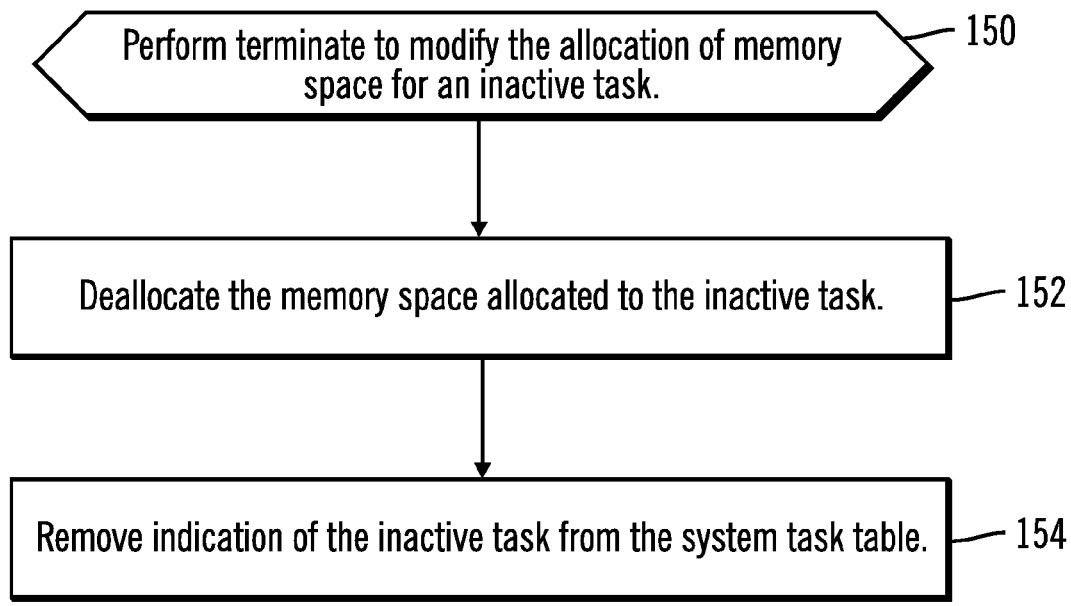
FIG. 7 illustrates an embodiment of operations to terminate an inactive task.

FIG. 7 illustrates an embodiment of operations performed by the memory manager 12 to modify the allocation of memory space by terminating the inactive task. Upon initiating the operation to terminate an inactive task (at block 150), the memory manager 12 deallocates (at block 152) the memory space allocated to the inactive task and removes (at block 154) indication of the inactive task from the system task table 18, i.e., removing the entry 50 (FIG. 2) for the inactive task 16.

The memory manager 12 may be configured to perform either suspension (FIG. 6) or termination (FIG. 7) when modifying the memory space allocation for an inactive task.

Figure 8:
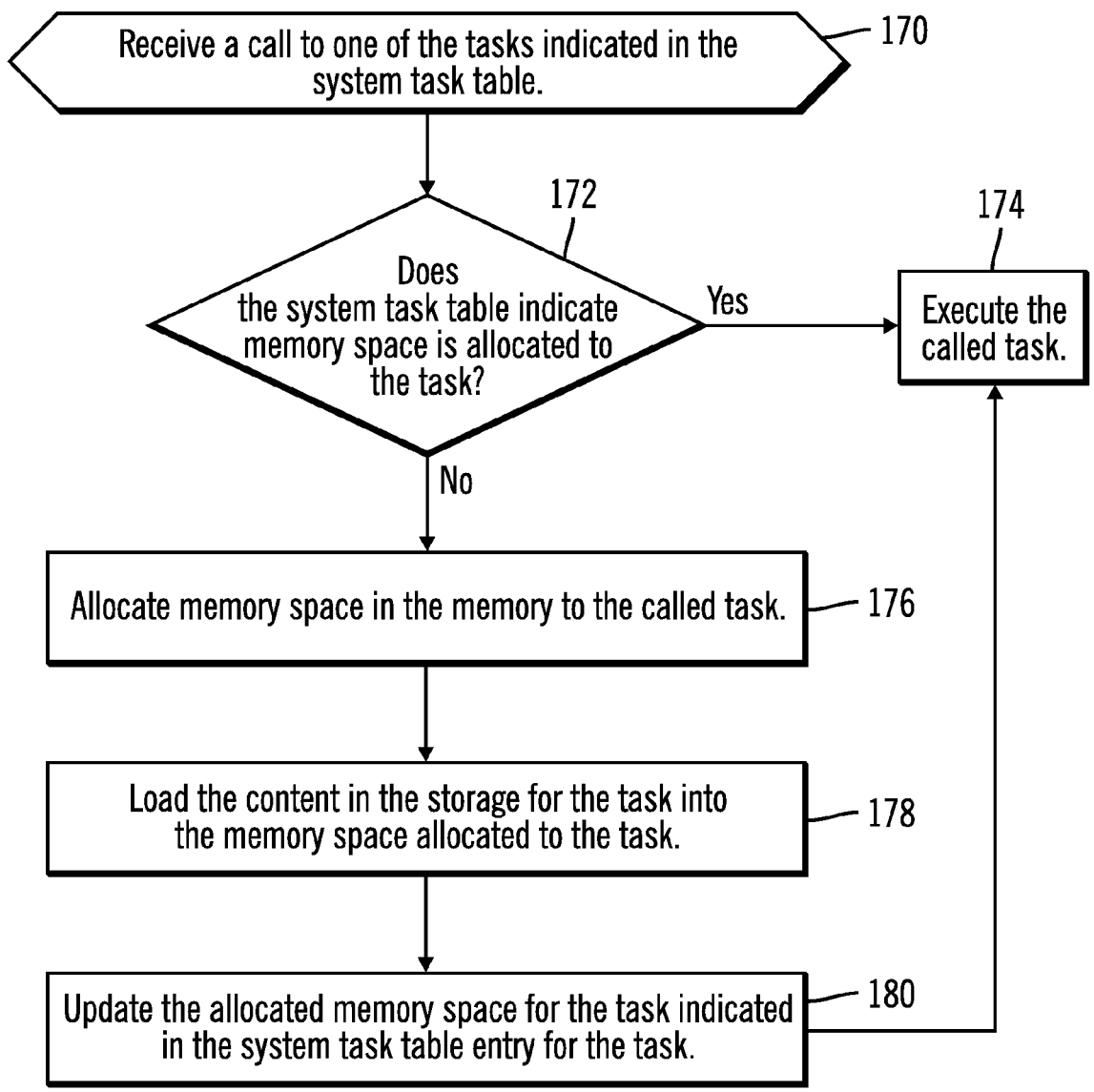
FIG. 8 illustrates an embodiment of operations to process a call to a task.

FIG. 8 illustrates an embodiment of operations performed by the operating system 8 and/or memory manager 12 to process a call to one of the tasks 16 indicated in an entry 50 of the system task table 18. Upon receiving (at block 170) the call, if (at block 172) the system task table 18 indicates that there is memory space 54 allocated to the called task 16, then the task is executed (at block 174). If (at block 172) there is no allocated memory space, i.e., the allocated memory space 54 indicates no allocation, then the memory manager 12 allocates (at block 176) memory space 14 to the called task 16 and loads (at block 178) the task content 32 in the storage 28 for the task 16 into the memory space 14 allocated to the task. The allocated memory space field 54 for the task in the system task table entry 50 is updated (at block 180) to indicate the memory space allocation. Control then proceeds to block 174 to execute the task 16 returned to memory.

The operations of FIG. 8 are performed when inactive tasks have been suspended per the operations of FIG. 6.

Figure 9:
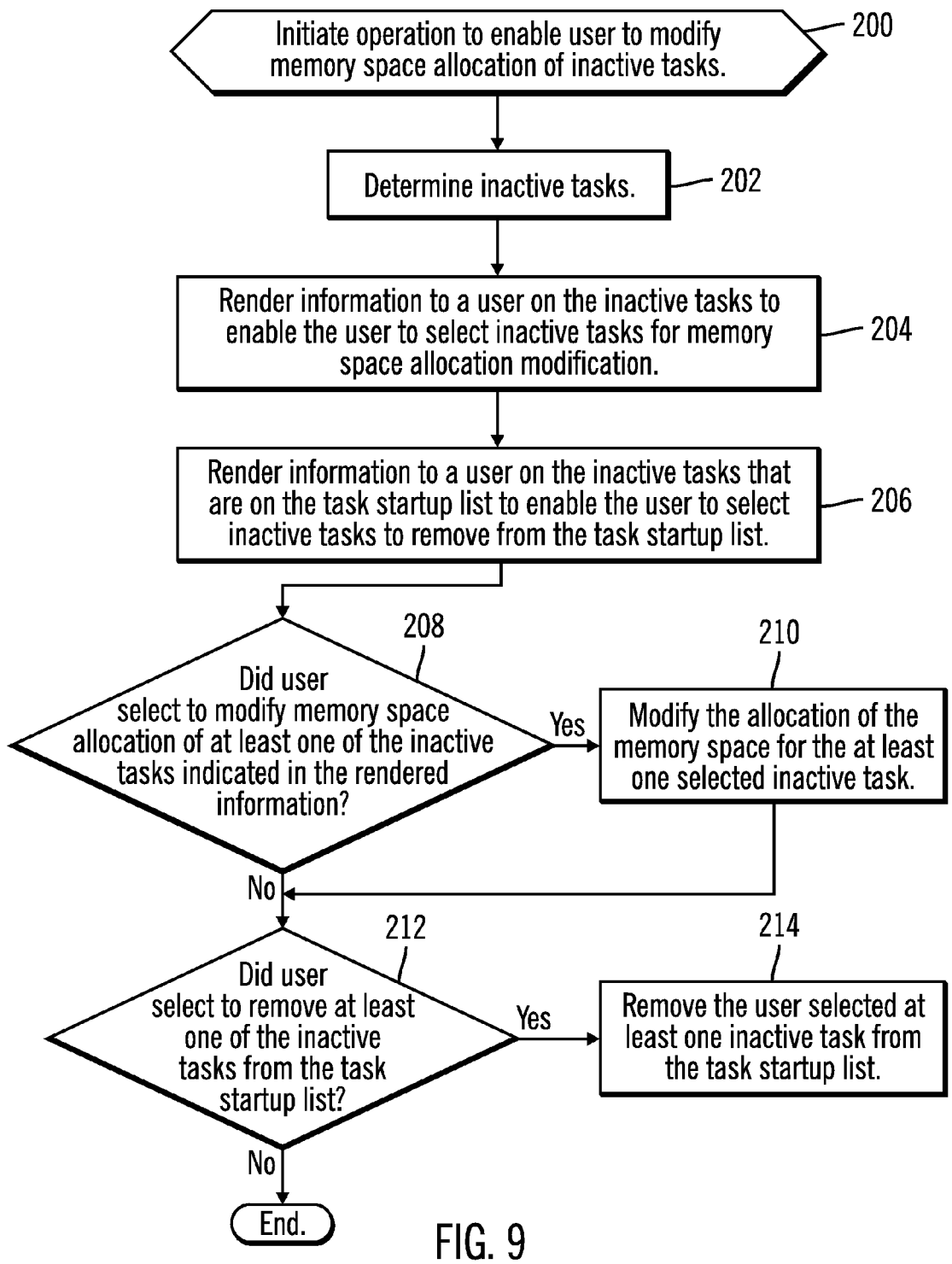
FIG. 9 illustrates an embodiment of operations to enable a user to modify memory space allocations for inactive tasks.

FIG. 9 illustrates an embodiment of operations performed by the operating system 6 and/or memory manager 12 to enable a user to selectively modify memory space allocations 14 for inactive tasks. Upon initiating (at block 200) the operation to enable the user to selectively modify memory space allocations, the memory manager 12 determines (at block 202) inactive tasks, such as by using the task resource consumption 70 information and the resource thresholds 24 as described above. The memory manager 12 renders (at block 204) in the task manager user interface 26 information on the inactive tasks 16 to enable the user to select inactive tasks for memory space allocation modification. The memory manager 12 further renders (at block 206) in the task manager user interface 26 information to a user on the inactive tasks that are on the task startup list 18 to enable the user to select inactive tasks to remove from the task startup list 18. The information rendered at blocks 204 and 206 may be in different panels, tabs or sections of the task manager user interface 26 when the task manager user interface 26 comprises a GUI. The information rendered at blocks 204 and 206 may include information on actual computational resource consumption, e.g., processor cycles 74, read/write requests 76, network requests 78, etc., to provide the user information that may be considered in selecting inactive tasks to subject to memory space allocation modification or removal from the task startup list 20.

If (at block 208) the user selected to modify the memory space allocation 14 of at least one of the inactive tasks indicated in the rendered information, then the memory manager 14 modifies (at block 210) the allocation 14 of the memory space for the at least one selected inactive task, such as performed in FIGS. 6 and 7. If (at block 212) the user selected to remove at least one of the inactive tasks 16 from the task startup list 20, then the selected inactive task is removed (at block 214) from the task startup list 20.

Figure 10:
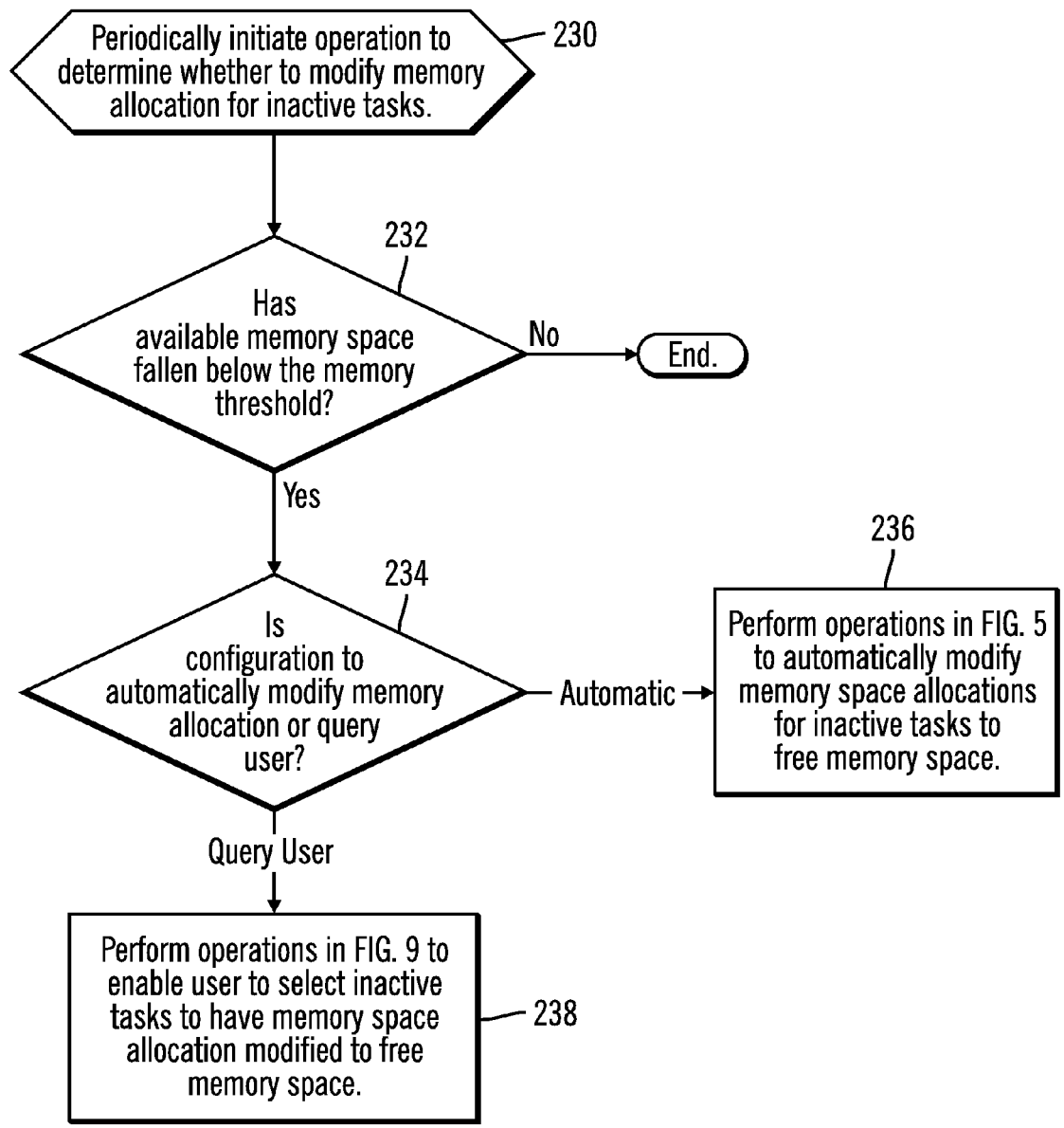
FIG. 10 illustrates an embodiment of operations to periodically initiate operations to modify memory space allocations.

FIG. 10 illustrates an embodiment of operations performed by the operating system 6 and/or memory manager 12 to initiate operations to determine whether to modify the memory allocation 14 of tasks 16. Upon periodically initiating (at block 230) an operation to free memory space for inactive tasks 16, the memory manager 12 determines (at block 232) whether the available memory space 6 for task allocations has fallen below the memory threshold 96. If not, control ends. Otherwise, if the available memory space 6 is too low, then the memory manager 12 determines whether it has been configured to automatically modify task memory allocations or query the user to request modifications of memory allocations. The memory manager 12 may have a default configuration, e.g., automatic or user requested as well as the capability to have the user or administrator configure the memory manager 12 for automatic or user requested memory allocation modifications. If (at block 234) the memory manager 12 is configured to automatically modify task memory allocations, then the memory manager 12 performs (at bock 236) the operations in FIG. 5 to automatically modify memory space allocations for inactive tasks 16. Otherwise, if the memory manager 12 is configured to query the user to modify task memory allocations, then the memory manager 12 performs (at bock 238) the operations in FIG. 9 to interact with the user via the task manager user interface 26 to have the user select inactive tasks for memory space allocation modification.

In alternative embodiment, the memory manager 12 may perform the operations at blocks 234, 236, and 238 without regard to the memory 6 resources that are available, so that memory space may be freed whether or not the total available memory 6 space is below the memory threshold 96.

In a further embodiment, the memory manager 12 may perform the operations in FIG. 9 right after system initialization to allow the user to select inactive tasks for memory space allocation modification and removal from the task startup list 20 based on task resource consumption in the previous session, system initialization or lifecycle.

Described embodiments provide techniques to determine inactive tasks and then select one or more inactive tasks for memory space allocation modification to reduce the memory space allocated to the inactive tasks. Described embodiments may deem a task inactive depending on computational resources consumed by the task, such as processor cycles, read/write requests, and network requests. Described embodiments may automatically modify the memory space allocation for inactive tasks or query the user to select inactive tasks for memory space allocation modification. The user may further be queried on whether to remove inactive tasks on a task startup list so that they are not allocated memory space upon system initialization.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, an application specific integrated circuit (ASIC), a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing tasks in a memory of a computer system having a storage, the computer program product comprising a computer readable storage medium having computer readable program code embodied therein that executes to perform operations, the operations comprising:
   maintaining information on computational resources consumed by tasks running in the computer system allocated memory space in the memory, wherein the tasks are identified in a system task table;
   for each of a plurality of the tasks identified in the system task table, using the information on the computational resources consumed by the tasks to determine inactive tasks of the tasks;
   modifying the allocation of the memory space allocated to at least one of the determined inactive tasks by modifying the memory space indicted as allocated to the determined inactive task in the system task table, wherein the system task table indicates the memory allocated to the determined inactive task after the modifying of the allocation of the memory space;
   receiving a call to a called task comprising one of the tasks indicated in the system task table; and
   in response to determining that the system task table does not indicate that memory space is allocated to the called task, performing:
      allocating memory space in the memory to the called task; and
      loading the content in the storage for the called task into the memory space allocated to the called task.

2. The computer program product of claim 1, wherein the computational resources for which information is maintained for each task includes at least one of read/write requests initiated by the task, a number of processor cycles used by the task, network requests initiated by the task, and functions invoked by the task, wherein using the information on the computational resources consumed by the tasks to determine inactive tasks comprises determining tasks whose computational resources consumed for at least one of the computational resources has fallen below a corresponding resource threshold for the computational resource.

3. The computer program product of claim 1, wherein the computational resources for which information is maintained include a plurality of different computational resources, wherein there is a corresponding resource threshold for each of the different computational resources, and wherein the inactive tasks comprise the tasks whose computational resources consumed for each of the different computational resources falls below the corresponding resource threshold.

4. The computer program product of claim 1, wherein the modifying the allocation of the memory space for one of the inactive tasks comprises:
   deallocating the memory space allocated to the inactive task; and
   removing indication of the inactive task for which the memory space allocation was modified in a system task table indicating tasks loaded into the memory.

5. The computer program product of claim 1, wherein the operations further comprise:
   determining whether available memory space has fallen below a memory threshold; and
   wherein the operations of using the information to determine inactive tasks and modifying the allocation of the memory space are performed in response to determining that the available memory space has fallen below the memory threshold.

6. The computer program product of claim 1, wherein the operations further comprise:
   maintaining a task startup list indicating tasks allocated memory space upon system initialization;
   determining whether the inactive task having its allocation of memory space modified is on the task startup list; and
   removing the inactive task determined to be on the startup list from the startup list.

7. The computer program product of claim 1, wherein the operations further comprise:
   rendering information to a user on the determined inactive tasks to enable the user to select from the inactive tasks for memory space allocation modification; and
   receiving user selection of at least one of the inactive tasks indicated in the rendered information, wherein the modifying the allocation of the memory space is performed for the at least one inactive task the user selected.

8. The computer program product of claim 1, wherein the operations further comprise:
   maintaining a task startup list indicating tasks allocated memory space upon system initialization;
   rendering information to a user on the inactive tasks on the task startup list to enable the user to select from the inactive tasks to be removed from the task startup list;
   receiving user selection to remove at least one of the inactive tasks for which the information is rendered; and
   removing the at least one user selected inactive task from the startup list of tasks.

9. The computer program product of claim 1, wherein the modifying the allocation of the memory space for one of the inactive tasks comprises:
   copying content of the memory space allocated to the inactive task to storage; and
   deallocating at least a portion of the memory space allocated to the inactive task in response to copying the content to storage.

10. The computer program product of claim 9, wherein the system task table indicates the memory space allocated to each of the indicated tasks;
    wherein the modifying the allocation of memory for the inactive task further comprises indicating in the system task table that no memory space is allocated to the inactive task.

11. A system in communication with a storage, comprising:
    a processor;
    a memory;
    a program executed by the processor to perform operations, the operations comprising:
       maintaining information on computational resources consumed by tasks running in the computer system allocated memory space in the memory, wherein the tasks are identified in a system task table;
       for each of a plurality of the tasks identified in the system task table, using the information on the computational resources consumed by the tasks to determine inactive tasks of the tasks;

modifying the allocation of the memory space allocated to at least one of the determined inactive tasks by modifying the memory space indicted as allocated to the determined inactive task in the system task table, wherein the system task table indicates the memory allocated to the determined inactive task after the modifying of the allocation of the memory space;

receiving a call to a called task comprising one of the tasks indicated in the system task table; and in response to determining that the system task table does not indicate that memory space is allocated to the called task, performing:
    allocating memory space in the memory to the called task; and
    loading the content in the storage for the called task into the memory space allocated to the called task.

12. The system of claim 11, wherein the computational resources for which information is maintained include a plurality of different computational resources, wherein there is a corresponding resource threshold for each of the different computational resources, and wherein the inactive tasks comprise the tasks whose computational resources consumed for each of the different computational resources falls below the corresponding resource threshold.

13. The system of claim 11, wherein the operations further comprise:
    maintaining a task startup list indicating tasks allocated memory space upon system initialization;
    determining whether the inactive task having its allocation of memory space modified is on the task startup list; and
    removing the inactive task determined to be on the startup list from the startup list.

14. The system of claim 11, wherein the operations further comprise:
    rendering information to a user on the determined inactive tasks to enable the user to select from the inactive tasks for memory space allocation modification; and
    receiving user selection of at least one of the inactive tasks indicated in the rendered information, wherein the modifying the allocation of the memory space is performed for the at least one inactive task the user selected.

15. The system of claim 11, wherein the computational resources for which information is maintained for each task includes at least one of read/write requests initiated by the task, a number of processor cycles used by the task, network requests initiated by the task, and functions invoked by the task, wherein using the information on the computational resources consumed by the tasks to determine inactive tasks comprises determining tasks whose computational resources consumed for at least one of the computational resources has fallen below a corresponding resource threshold for the computational resource.

16. The system of claim 11, wherein the modifying the allocation of the memory space for one of the inactive tasks comprises:
    deallocating the memory space allocated to the inactive task; and
    removing indication of the inactive task for which the memory space allocation was modified in a system task table indicating tasks loaded into the memory.

17. The system of claim 11, wherein the operations further comprise
    determining whether available memory space has fallen below a memory threshold; and
    wherein the operations of using the information to determine inactive tasks and modifying the allocation of the memory space are performed in response to determining that the available memory space has fallen below the memory threshold.

18. The system of claim 11, wherein the operations further comprise:
    maintaining a task startup list indicating tasks allocated memory space upon system initialization;
    rendering information to a user on the inactive tasks on the task startup list to enable the user to select from the inactive tasks to be removed from the task startup list;
    receiving user selection to remove at least one of the inactive tasks for which the information is rendered; and
    removing the at least one user selected inactive task from the startup list of tasks.

19. The system of claim 11, wherein the modifying the allocation of the memory space for one of the inactive tasks comprises:
    copying content of the memory space allocated to the inactive task to storage; and
    deallocating at least a portion of the memory space allocated to the inactive task in response to copying the content to storage.

20. The system of claim 19, wherein the system task table indicates the memory space allocated to each of the indicated tasks;
    wherein the modifying the allocation of memory for the inactive task further comprises indicating in the system task table that no memory space is allocated to the inactive task.

* * * * *